US005802187A

United States Patent [19]

Hsu

[11] Patent Number: 5,802,187

[45] Date of Patent: Sep. 1, 1998

[54] TWO-CHANNEL PROGRAMMABLE SOUND GENERATOR WITH VOLUME CONTROL

[75] Inventor: Jerry Hsu, Tainan, Taiwan

[73] Assignee: United Microelectronics Corp., Hsinchu, Taiwan

[21] Appl. No.: 592,128

[22] Filed: Jan. 26, 1996

[51] Int. Cl.$^{6}$ .................................................... H04B 1/00

[52] U.S. Cl. ............................ 381/119; 381/104; 84/625; 84/660; 84/617; 84/655; 327/172; 375/238; 341/152; 370/205; 370/212; 370/297

[58] Field of Search ............................ 341/152; 375/238; 370/297, 205, 212; 327/172; 84/625, 660, 617, 655; 381/119, 104; 330/10

[56] References Cited

U.S. PATENT DOCUMENTS

| | | | |
|---|---|---|---|
| 4,632,001 | 12/1986 | Suzuki . | |
| 4,992,792 | 2/1991 | Mori et al. | 341/147 |
| 5,150,415 | 9/1992 | Jaffee et al. | 381/104 |
| 5,231,240 | 7/1993 | Lu | 84/660 |
| 5,442,125 | 8/1995 | Hanzawa et al. | 84/602 |
| 5,592,559 | 1/1997 | Takahashi et al. | 381/111 |

OTHER PUBLICATIONS

"Digital Audio Mixer", Elektor, Jul./Aug. 1978, pp. 7–58.

*Primary Examiner*—Forester W. Isen
*Attorney, Agent, or Firm*—Christensen, O'Connor, Johnson & Kindness PLLC

[57] ABSTRACT

Disclosed is a programmable sound generator for generating digital outputs of tone and noise signals used for producing computer sound effects. The programmable sound generator includes at least two channels generating digital output serving as either tone signal or noise signal. A mixer is used to process the outputs of the channels in a digital, time-sharing manner. A volume controller coupled to the mixer is used to control the volume of the sound in a digital pulse width modulation (PWM) manner. Also, the volume controller allows its output to become floating when the programmable sound generator is not in use so as to allow another sound generating means to share the same sound transducing means. In the programmable sound generator, the tone generation and the noise generation share the same hardware, which allows low-cost production of the programmable sound generator.

27 Claims, 7 Drawing Sheets

TWO-CHANNEL PROGRAMMABLE SOUND GENERATOR WITH VOLUME CONTROL

BACKGROUND OF THE INVENTION

1. Field of the Invention

The present invention relates to programmable sound generators, and more particularly, to a programmable sound generator capable of generating tones/noise for use to produce digital sound effects.

2. Description of Prior Art

A programmable sound generator is a device used in microprocessor systems for generating digital tone and noise signals used to synthesize sound effects and music for various computer applications as video games, multimedia presentations, and virtual-reality simulations where the adding of sounds creates a sense of realism to the task being performed. Usually, the programmable sound generator is fabricated in a single IC package which cooperates with the microprocessor to generate the sound, and which can work independently after it receives sound generating commands from the microprocessor so that the microprocessor can be freed to perform other tasks.

To synthesize various sound effects and music, the programmable sound generator is designed to generate two kinds of bit streams: tone and noise. The tone signal is a succession or arrangement of bit streams in agreeable form which can be synthesized into rhythmical succession of musical tones, while the noise signal is a random, or pseudo random, succession of bit streams, which can be used to produce noise effects as crashing sound, explosive sound, or the like.

Programmable sound generators of the type noted above include one produced by General Instrument Corporation with a part number AY38912. Others include U.S. Pat. No. 4,933,980 to Thompson, U.S. Pat. No. 4,685,134 to Wine, and U.S. Pat. No. 4,475,228 to Vickers.

The AY38912IC is capable of generating multi-channel sound effects but due to its high-end capabilities, circuit complexity is high and thus the production cost is considerably high. Besides in these conventional PSGs, analog outputs are used to drive the speaker to transform bit streams of sound data into audible sounds perceptible by the ear, thus requiring the use of digital-to-analog converters (DAC). The use of DACs also considerably increases the hardware cost. In low-cost applications such as handheld game machines, these conventional PSGs would therefore be too costly to use.

One low-cost solution to sound effects generation is to use the CPU and its built-in clock in conjunction with an output port to produce the desired sound effects, such like that produced by the built-in speaker in personal computers. However, this approach would burden the CPU with the task of the sound effects generation and therefore is undesirable in most applications. Another drawback to the use of CPU for sound effects generation is that multi-channel sound generation is unfeasible.

SUMMARY OF THE INVENTION

It is therefore a primary objective of the present invention to provide a programmable sound generator which generates only digital outputs without any analog outputs.

It is another objective of the present invention to provide a programmable sound generator which has multi-channel sound generating capability and is capable of multiplexing tone/noise signals in a time-sharing manner.

It is still another objective of the present invention to provide a programmable sound generator which includes built-in volume control.

It is yet another objective of the present invention to provide a programmable sound generator which allows the generation of tone and that of noise to share the same hardware so as to reduce cost.

In accordance with the foregoing and other objectives of the present invention, there is provided with a new and improved programmable sound generator. The programmable sound generator comprises (a) at least a first channel for generating a digital output selectively switchable between a tone signal and a noise signal; (b) at least a second channel for generating a digital output selectively switchable between a tone signal and a noise signal; (c) clock means for generating clock signals for timing control of the first channel and the second channel; (d) a mixer for mixing the output of the first channel and the output of the second channel in a time-multiplexing manner to produce a mixed signal; (e) a volume controller, taking the mixed signal and a software-specified control signal as inputs, for generating a pulse train having a pulse width varied in accordance with the software-specified control signal; and (f) a digital sound transducer, coupled to the volume controller, for producing an audible sound with a volume level proportional to the pulse width of the output pulse train of the volume controller. In various modifications, the channels can be each coupled with a volume controller.

In the programmable sound generator according to the present invention, since the tone generation and the noise generation share the same hardware and there are no analog outputs in the circuit, it is a primary benefit of the present invention that low-cost production of the programmable sound generator is allowed. Further, the simplicity in the structure of the programmable sound generator allows it to be easily integrated as a built-in sound generating means in low-end applications.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
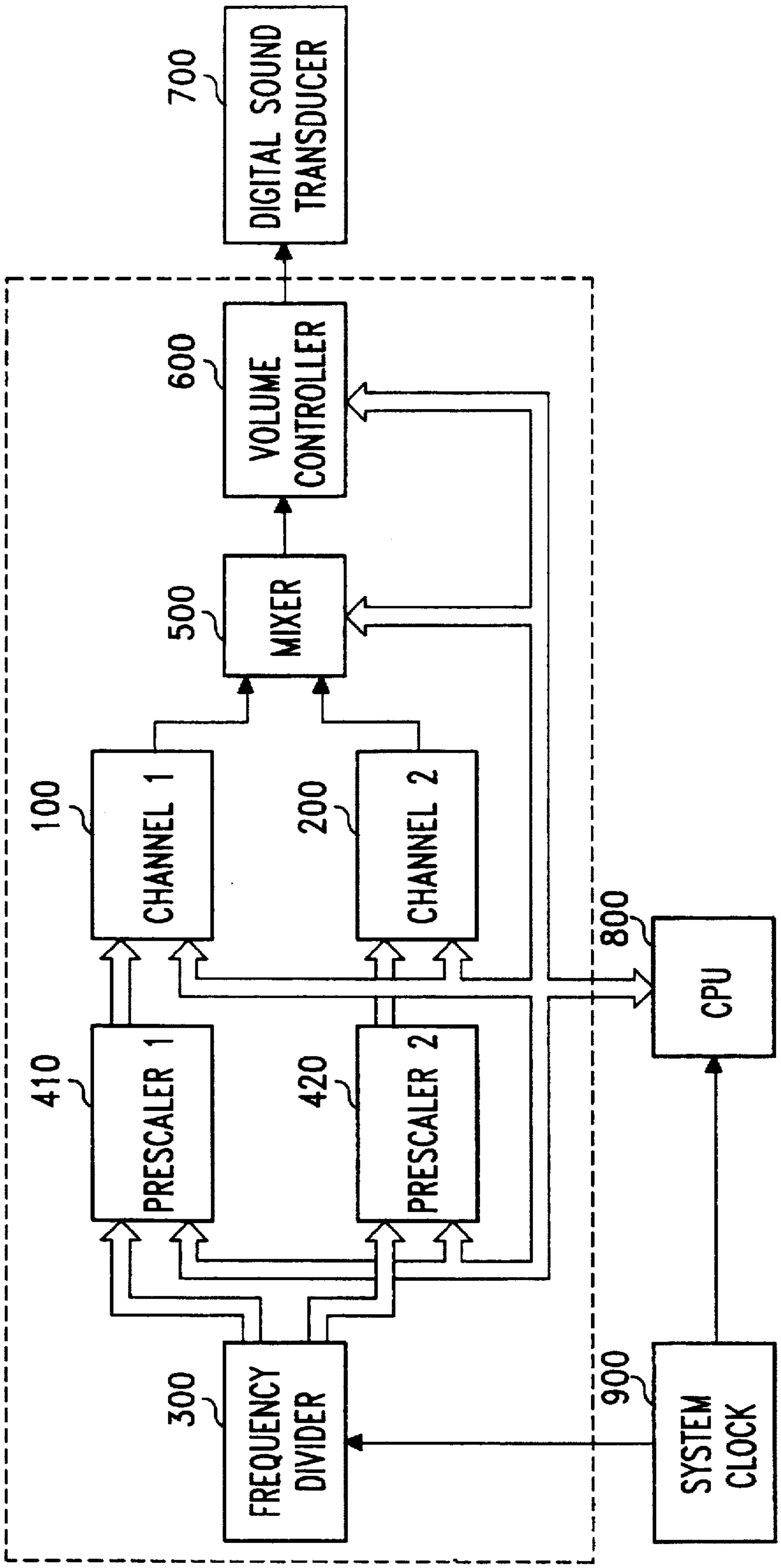
FIG. 1 shows a block diagram of a microprocessor system provided with a programmable sound generator according to the first preferred embodiment of the present invention.

FIG. 1 shows a block diagram of a microprocessor system provided with a preferred embodiment of the programmable sound generator (PSG) according to the present invention, which includes two channels 100 and 200, in combination with a frequency divider 300, two respective prescalers 410, 420, a mixer 500, a volume controller 600, and a digital sound transducer 700. The programmable sound generator works under the control of the central processing unit (CPU) 800 of the microprocessor system and the timing thereof is controlled by the system clock 900 which, in the present embodiment, supplies a clock signal of 128 kHz. To allow the programmable sound generator to generate tones of various frequencies, the frequency divider 300 is devised to divide the system clock signal of 128 kHz into four outputs of various frequencies including 32 kHz, 16 kHz, 8 kHz, and 4 kHz for the programmable sound generator to produce various octaves.

Figure 2:
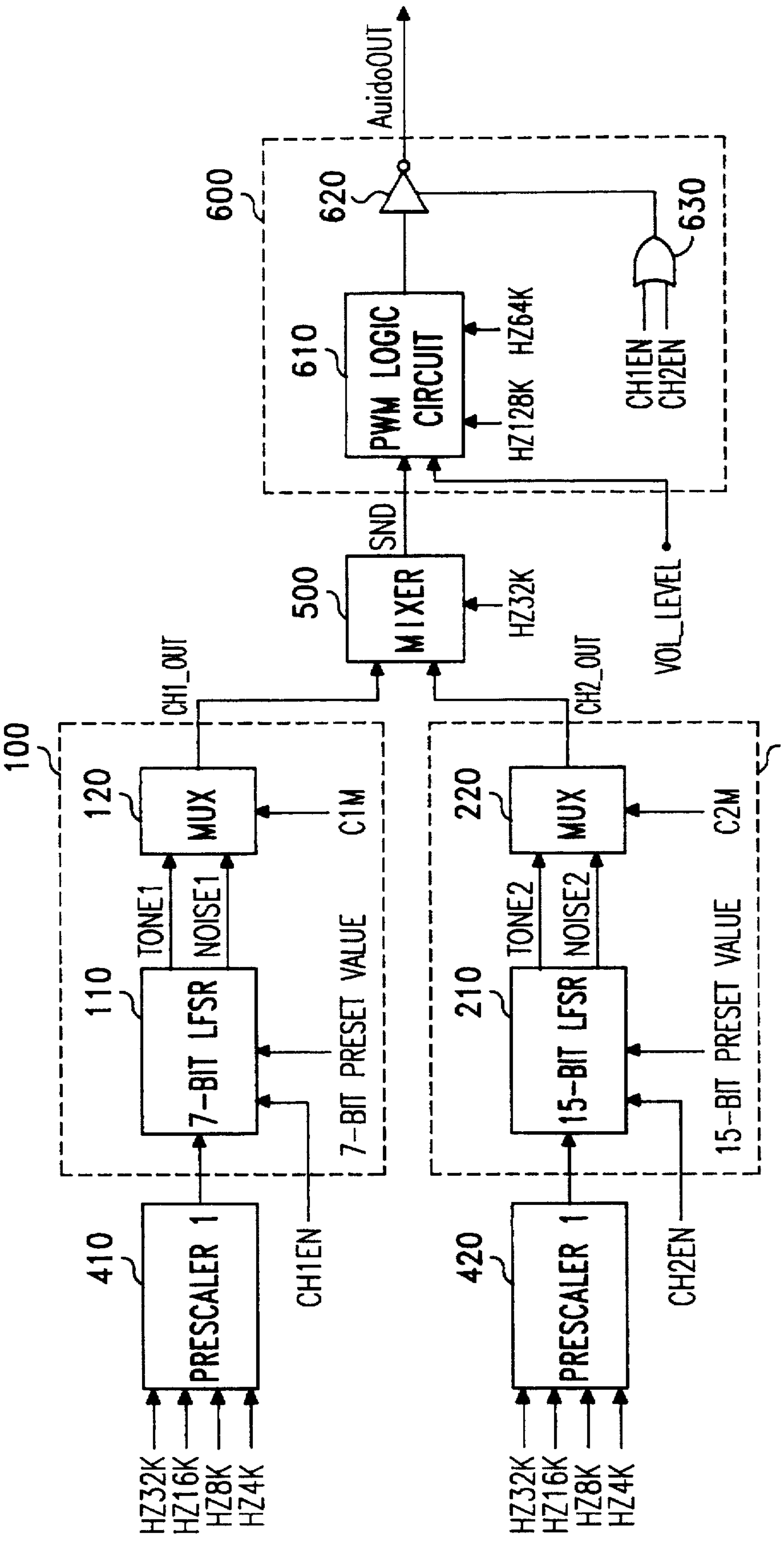
FIG. 2 shows a detailed block diagram of the programmable sound generator of FIG. 1.

Referring also to FIG. 2, these four frequency outputs are multiplexed by the prescalers 410, 420 under CPU control to feed the selected frequency output to the two channels 100, 200 for sound generation of specific octaves. The functional disclosure of the frequency divider 300 and the prescalers 410, 420 heretofore should allow anyone skilled in the art of logic circuit design to devise and use them without unduly experiments, therefore detailed disclosure thereof will not be given here in this specification.

The first channel 100 includes a 7-bit linear feedback shift register (LFSR) 110 and the second channel 200 includes a 15-bit LFSR 210, both of the LFSRs 110,210 being used for generating bit sequences that can be selectively used as either tone signals (TONE1, TONE2) or noise signals (NOISE1, NOISE2) for producing various sound effects. Multiplexers 120, 220 are used for the selection of either tone signal or noise signal as the outputs of the two channels 100, 200, controlled by the C1M and C2M signals from the CPU 800.

In practice, however, the 7-bit LFSR 110 is specifically used for tone generation and the noise mode is ordinarily not in use since a 7-bit noise signal is in general not acceptable in the sound quality. Since a 7-bit tone signal is adequate for melody generation, the 15-bit LFSR 210 uses only 7 of its 15 bits for tone generation and the full set of 15 bits for noise generation. A 15-bit noise signal would produce high-quality noise effects. Specific number of bits for the two LFSRs 110, 210 is a matter of design choice specified in accordance with product requirements. In various modifications, such when cost is in concern, a 12-bit LFSR can be used in place of the 15-bit LFSR 210. The two channels 100, 200 can continue to generate the desired tone/noise signals after receiving the initial command issued by the CPU 800.

The output of the first channel 100 and that of the second channel 200 are to be mixed by a mixer 500 in a digital, time-sharing manner in accordance with an important aspect of the present invention. The volume controller 600 cascaded to the mixer 500 is comprised of a PWM logic circuit 610 and a tri-state buffer circuit 620 having its output controlled by two inputs CH1EN and CH2EN which are each a binary bit used elsewhere to enable the first channel 100 and the second channel 200. The volume of the sound output can be software controlled via the input VOL_LEVEL, which accepts a set of control bits with a value corresponding to the desired level of sound to be produced by the digital sound transducer 700. It is an important aspect of the present invention that the output of the volume controller 600 is digital, which is directly used, without having to convert it to analog signal beforehand, to drive the digital sound transducer 700 for producing sounds perceptible by the ear. Detailed functions and structures of these blocks will be described later in this specification. Moreover, the preset values to the LFSRs 110, 210 determine the frequency of the tone to be produced. The channels 100, 200 are used only to generate digital outputs of various frequencies while the CPU 800 controls how the notes, beats, and melody are to be produced. The sound generation techniques involved are also conventional art so that no detailed description thereof will be given.

Figure 3:
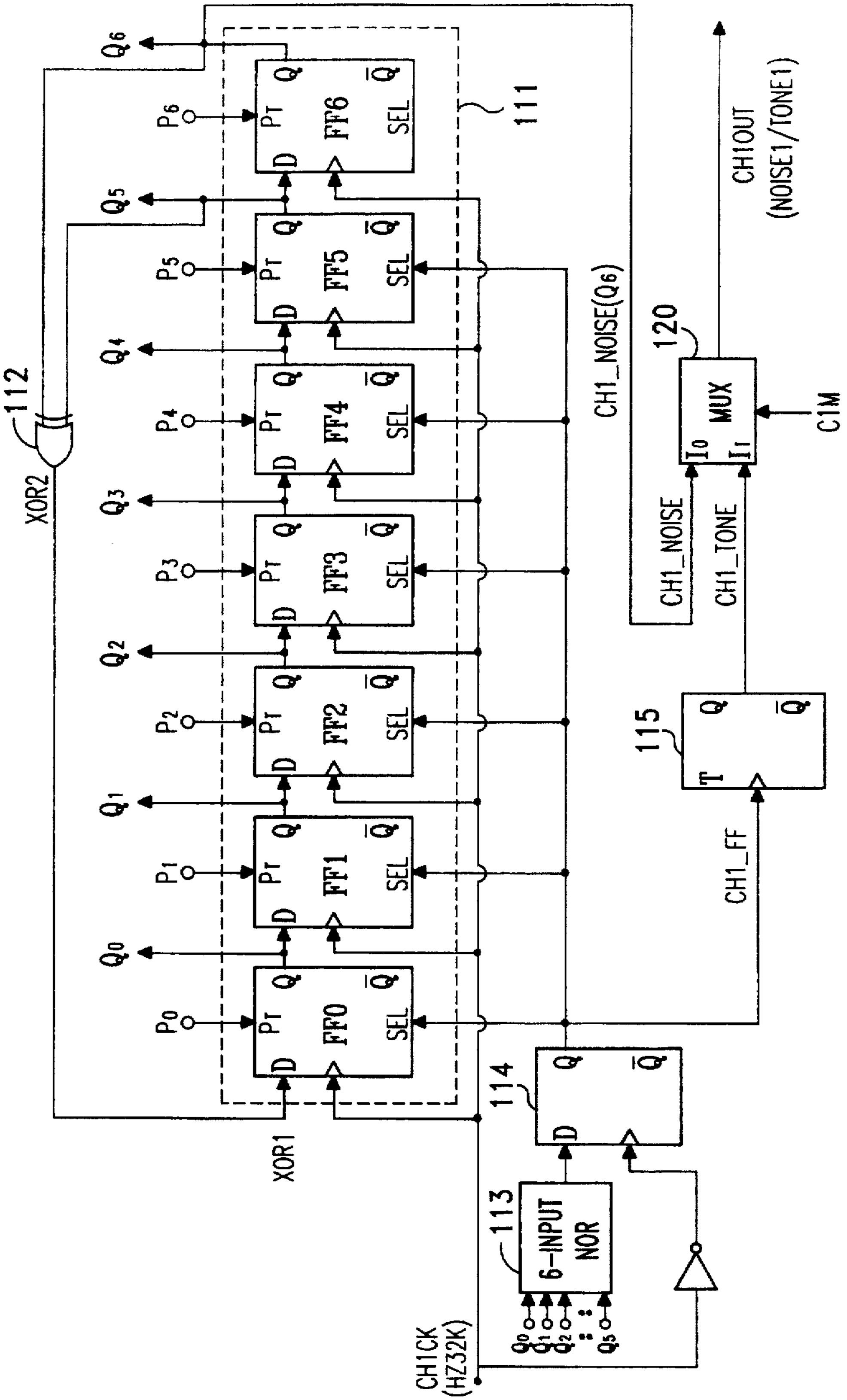
FIG. 3 shows a logic diagram of a tone/noise generator (channel 1) employed in the programmable sound generator of FIG. 1.

Referring to FIG. 3, the 7-bit LFSR 110 in the first channel 100 includes a set 111 of seven cascaded D-type flip-flops FF0', FF1', FF2', FF3', FF4', FF5', and FF6' with output bits ($Q_0$, $Q_1$, $Q_2$, $Q_3$, $Q_4$, $Q_5$, $Q_6$). An XOR gate 112 takes the last two output bits ($Q_5$, $Q_6$) as inputs and feeds the output XOR1 to the input of the first D-type flip-flops FF0'. Initial preset values for the output bits ($Q_0$, $Q_1$, $Q_2$, $Q_3$, $Q_4$, $Q_5$, $Q_6$) can be preset via the input ports ($P_0$, $P_1$, $P_2$, $P_3$, $P_4$, $P_5$, $P_6$) by means of software control. The output bits ($Q_0$, $Q_1$, $Q_2$, $Q_3$, $Q_4$, $Q_5$) of the shift register 111 are processed by a 6-input NOR gate 113 to obtain an output delayed by another D-type flip-flop 114. The output CH1_FF of the D-type flip-flop 114 is subsequently fed bifurcately, in one way directly to the SEL port of each of the D-type flip-flops in the shift register 111 and in the other way to a T-type flip-flop 115. The T-type flip-flop 115 functionally modulates the CH1_FF signal in duty cycle to 50% to produce an output which is a bit sequence serving as the tone signal CH1_TONE that can be used for melody synthesis. The serial output taken from the last bit $Q_6$ is used as the noise signal CH1_NOISE. The two outputs CH1_TONE (TONE1) and CH1_NOISE (NOISE1) are fed to the multiplexer 120, which, under CPU control by the C1M signal, selects either of the two signals as the output as the output CH1OUT of the first channel 100. The configuration shown here is well-known technique to generate bit sequences, which is taught in a textbook entitled "*Digital Integrated Electronics*" (refer particularly to Chapter 10), which is authored by Taub, Herbert et al. and published by McGraw-Hill. Detailed description of the principles thus will not be given here in this specification.

Figure 4:
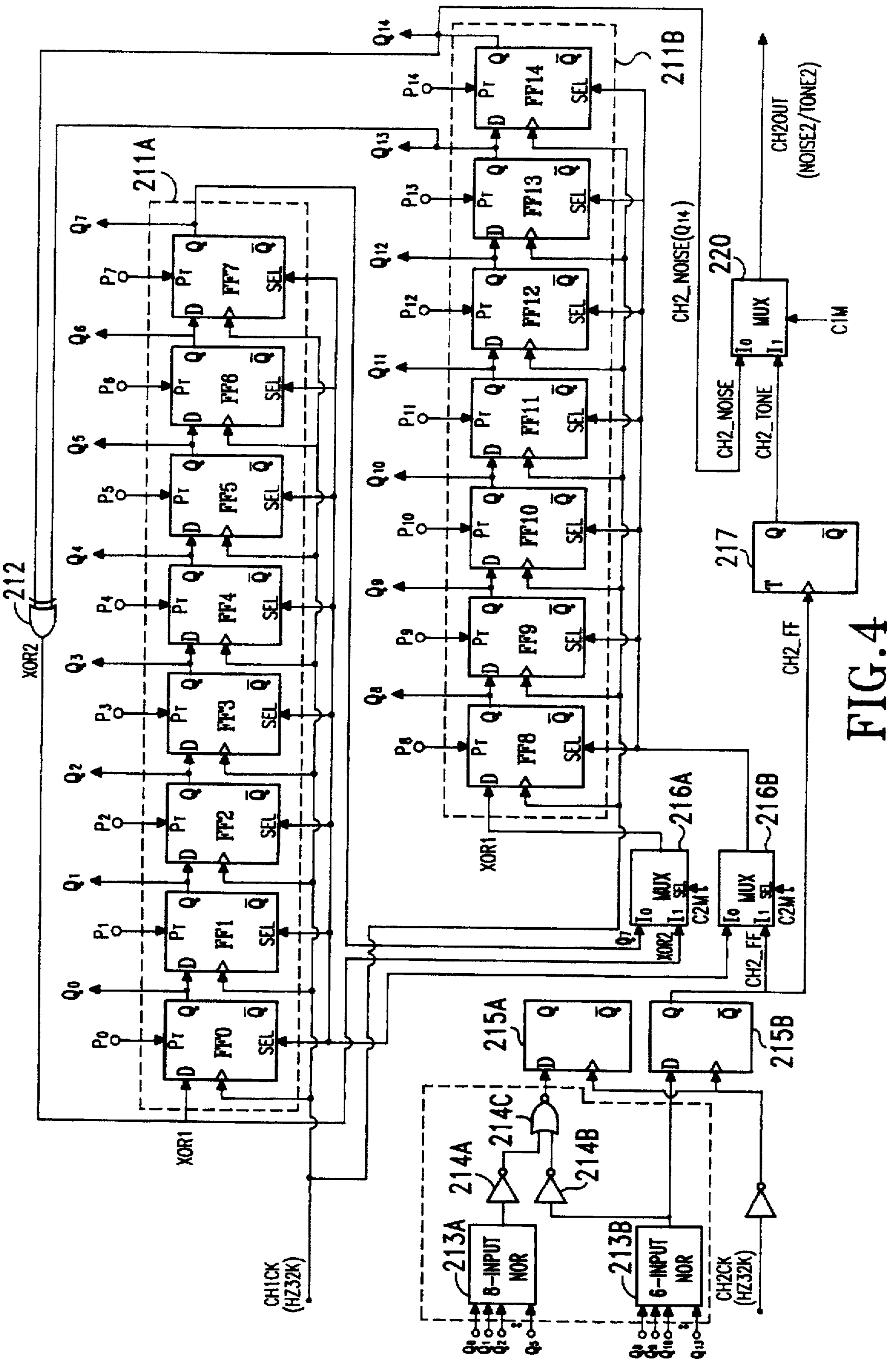
FIG. 4 shows a logic diagram of a tone/noise generator (channel 2) employed in the programmable sound generator of FIG. 1.

Referring to FIG. 4, the 15-bit LFSR 210 in the second channel 200 includes two sets of shift registers 211A and 211B, the first shift register 211A consisting of eight D-type flip-flops: FF0", FF1", FF2", FF3", FF4", FF5", FF6", and FF7", and the second shift register 211B consisting of seven D-type flip-flops: FF8", FF9", FF10", FF11", FF12", FF13", and FF14". The 15-bit LFSR 210 is devised in such a way in accordance with another important aspect of the present invention that, when the second channel 200 is used for tone generation, only the 7 D-type flip-flops in the second shift register 211B is used, and when used for noise generation, the total of the 15 D-type flip-flops are used.

In tone mode, the CPU controlled signal C2M selects the $I_1$ input to the multiplexers 216A, 216B, and 220. This allows the output XOR2 of the exclusive-or operation (performed by an XOR gate 212) on the last two output bits ($Q_{13}$, $Q_{14}$) of the shift register 211B to be fed via the multiplexer 216A to back to the input of the first flip-flop FF8" and also allows the output of the NOR operation (performed here by a 6-input NOR gate 213B) on the output bits ($Q_8$, $Q_9$, $Q_{10}$, $Q_{11}$, $Q_{12}$, $Q_{13}$) to be selected by the multiplexer 216B so as to be fed to the SEL port of the D-type flip-flops. This connection results in a circuit configuration identical in structure and function to the 7-bit LFSR 110 shown in FIG. 3. According, the programming for control of the shift register 211B can be done in a similar way. Similarly, the signal CH2_FF is modulated in duty cycle to 50% by a T-type flip-flop 217 to obtain an output which serves as the tone signal CH2_TONE that can be used for melody synthesis.

On the other hand, in noise mode, the CPU controlled signal C2M selects the $I_0$ input to the multiplexers 216A, 216B, and 220. This allows the last output bit $Q_7$ of the first shift register 211A to be fed to the input of the first D-type flip-flop, namely FF8", in the second shift register 211B, resulting in a combined shift register having 15 D-type flip-flops in which the serial output taken from the last bit $Q_{14}$ serves as the noise signal CH2_NOISE The output bits ($Q_0$, $Q_1$, $Q_2$, $Q_3$, $Q_4$, $Q_5$, $Q_6$ , $Q_7$) are fed serially to an 8-input NOR gate 213A and the output bits ($Q_8$, $Q_9$, $Q_{10}$, $Q_{11}$, $Q_{12}$, $Q_{13}$) are fed serially to a 6-input NOR gate 213B. A logic circuit consisting of two inverters 214A, 214B and a NOR gate 214C is used couple the output of the 8-input NOR gate 213A and the output of the 6-input NOR gate 213B so as to combine them into a 14-input NOR gate (indicated by dotted box). The output of this 14-input NOR gate is subsequently delayed in the D-type flip-flop 215A. The output of the D-type flip-flop 215A is then fed bifurcately, in one way directly to the SEL port of each of the D-type flip-flops in the first shift register 211A and in the other way via the multiplexer 216B to the same in the second shift register 211B. In effect, the total of the 15 D-type flip-flops are enabled. Since the multiplexer 220 at this time selects the last output $Q_{14}$, of the last D-type flip-flop FF14" as the output (which serves as a noise signal termed CH2_NOISE), the CH2OUT signal is a noise signal (NOISE2) generated by 15-bit LFSR.

Figure 5:
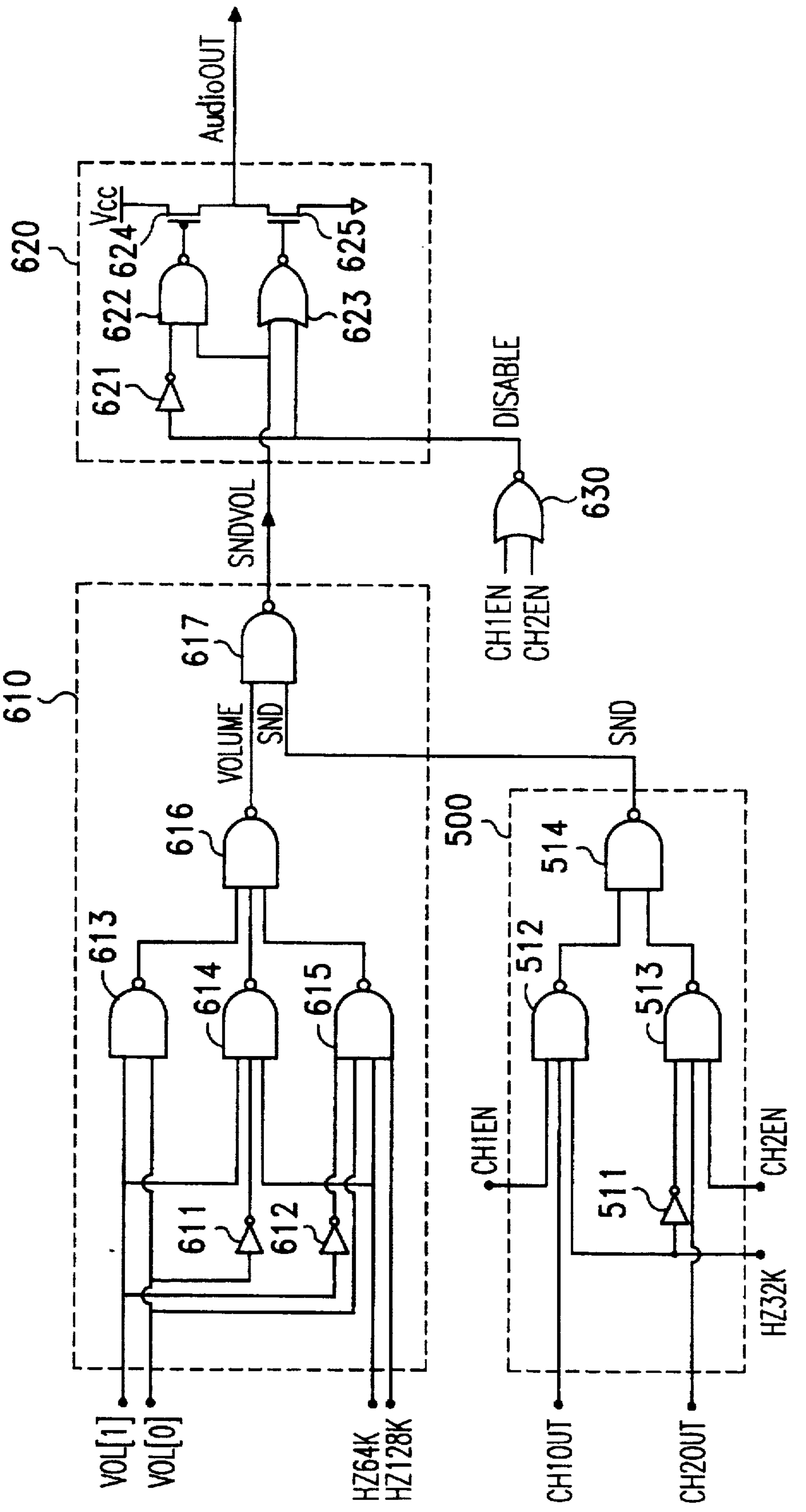
FIG. 5 shows a logic diagram of a volume controller and a mixer employed in the programmable sound generator of FIG. 1.

Referring back to FIGS. 1 and 2, it is an important aspect of the present invention that the two output signals CH1OUT and CH2OUT are interleaved by a mixer 500 to be subsequently fed into the volume controller 600 for volume control in a digital, time-sharing manner. Referring also to FIG. 5, the mixer 500 is composed of an inverter 511 and three NAND gates 512, 513, and 514 configured as shown. The clock signal HZ32K, which is used to control the timing of the two channels 100 and 200, is also used here to multiplex the output signals CH1OUT and CH2OUT of the two channels 100 and 200. The clock signal HZ32K is coupled directly to one input of the NAND gate 521 and via the inverter 511 to one input of the NAND gate 513. With this configuration, when the clock signal HZ32K goes high (bit=1), the NAND gate 512 is enabled (with CH1EN=1 under CPU control), whereby CH1OUT is selected as the output; and when the clock signal HZ32K goes low (bit=0), the NAND gate 513 is enabled (with CH2EN=1 under CPU control), whereby CH2OUT is selected as the output. As a result of the mixing, the output signal SND of the mixer 500 is the interleaving of the output signal CH1OUT of the first channel 100 and the output signal CH2OUT of the second channel 200.

Subsequently, the output signal SND of the mixer 500 is fed into the PWM logic circuit 610, which is a constituent part of the volume controller 600, for volume control. The PWM logic circuit 610 takes a software-specified signal consisting of two control bits (VOL[1], VOL[0]) for control of the level of desired volume in the following manner:

(VOL[1], VOL[0])=(0,0) for no sound output (duty cycle 0%), (VOL[1], VOL[0])=(0,1) for low volume output (duty cycle 25%), (VOL[1], VOL[0])=(1,0) for intermediate volume output (duty cycle 75%), and (VOL[1], VOL[0])=(1,1) for high volume output (duty cycle 100%).

It is to be noted that other modifications to the number of the control bits are possible, which can be 4-bit, 6-bit, or more. Using a greater number of control bits allows fine adjustment of the volume level although cost and hardware complexity would be high for this scheme. The control bits (VOL[1], VOL[0]) along with two clock signals HZ64K, HZ128K are the inputs to the PWM logic circuit 610 for generating the modulation pulse. As shown in FIG. 5, the PWM logic circuit 610 is composed of two inverters 611, 612 and five NAND gates 613, 614, 615, 616, and 617. The final NAND gate 617 takes the output VOLUME from the NAND gate 616 and the output SND from the mixer 500 as inputs to obtain the output SNDVOL that is the sound signal after volume control.

The tri-state buffer circuit 620 cascaded in subsequence to the PWM logic circuit 610 includes an inverter 621, a NAND gate 622 coupled to the gate of a PMOS 624, and a NOR gate 623 coupled to the gate of a NMOS 625. The provision of the NOR gate 630 in combination with the inverter 621, the NAND gate 622, and the NOR gate allows the output AudioOUT to be enabled only when at least one of the two channels 100 and 200 are enabled by the signals CH1EN and CH2EN. The purpose of this tri-state buffer is to allow the programmable sound generator to share the same sound transducing means as a speaker with another sound generating means as a speech IC or the like, which will be described in more detail later with reference to FIG. 7B.

Figure 6:
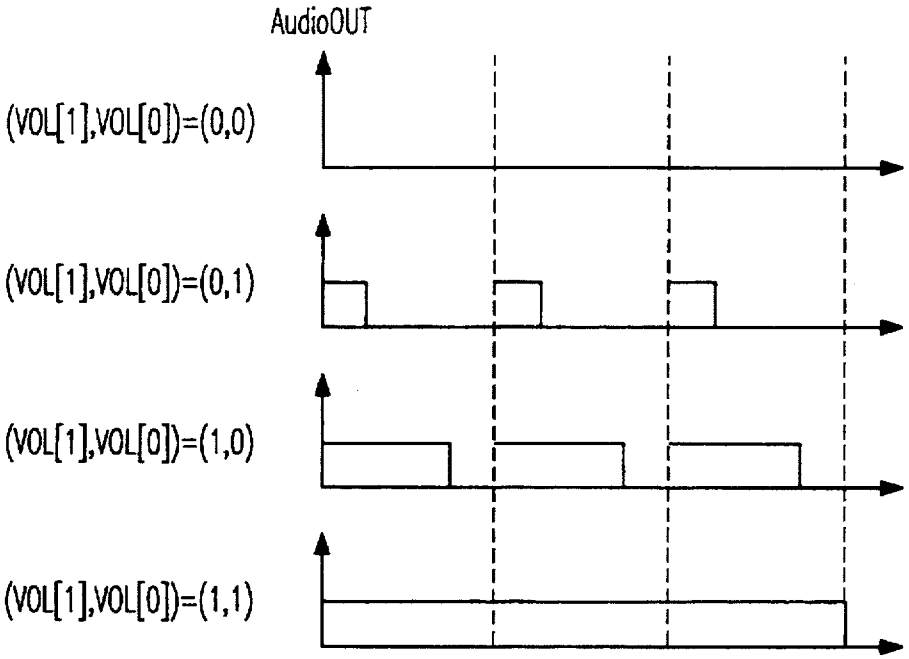
FIG. 6 shows waveform diagrams of various signals used by the volume controller for volume control of digital sound by means of pulse width modulation (PWM) method.

When the AudioOUT is enabled, the output SNDVOL drive the PMOS 624 and NMOS 625 in a PWM manner that allows the AudioOUT output to be a pulse train having a pulse width varied corresponding to the value of the control bits (VOL[1], VOL[0]). As for example shown in FIG. 6, when (VOL[1], VOL[0])=(0,0), the AudioOUT output is 0, which is equivalent to a pulse train with a duty cycle of 0% (no sound); when (VOL[1], VOL[0])=(0,1), the AudioOUT output is a pulse train with a duty cycle of 25% (low volume sound); when (VOL[1], VOL[0])=(1,0), the AudioOUT output is a pulse train with a duty cycle of 75% (intermediate volume sound); and when (VOL[1], VOL[0])=(1,1), the AudioOUT output is a pulse train with a duty cycle of 100% (high volume sound). Such a provision allows a pulse width modulation (PWM) way of controlling the level of the sound volume.

Figure 7A:
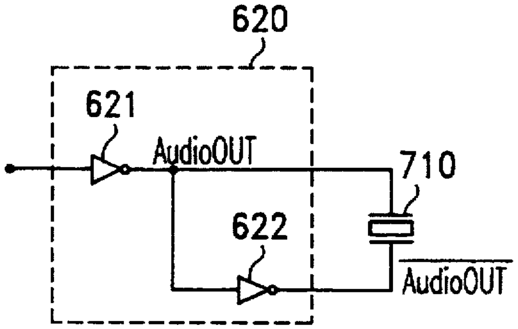
FIGS. 7A–7B are two circuit diagrams, showing respectively two different embodiments for a digital sound transducer employed in the programmable sound generator according to the present invention.
Figure 7B:
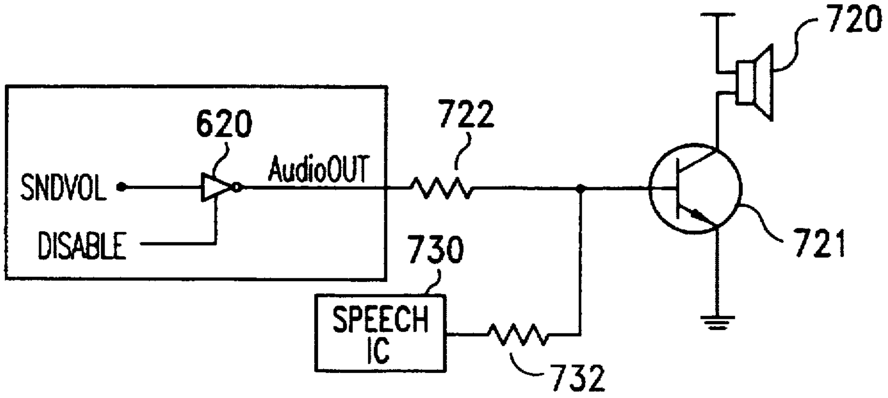

Referring to FIGS. 1 and 2 together with FIGS. 7A–7B, the output signal AudioOUT of the volume controller 600 is used to drive the digital sound transducer 700, which can be devised in two different embodiments as respectively shown in FIG. 7A and FIG. 7B. In the embodiment of FIG. 7A, the digital sound transducer 700 includes a piezoelectric device 710 driven by two inverters 621, 622. This arrangement allows the piezoelectric device 710 to be always applied with a positive pulse on one side and a negative pulse on the other side from the AudioOUT signal, thereby allowing the piezoelectric device 710 to generate the desired sound. In the embodiment of FIG. 7B, the digital sound transducer 700 shares the same sound producing means including a speaker 720 and a transistor 721 with a speech IC 730 which is also a sound generating means independent to the programmable sound generator. The speech IC 730 is also incorporated with a similar tri-state buffer circuit (not shown) at its output. Similarly, the output of the speech IC 730 is connected to a resistor 732. With the provision of tri-state buffer circuit in each sound generating means, the speech IC 730 can use the speaker 720 for sound reproduction when the programmable sound generator is not in use, i.e., when both of the channels 100 and 200 are disabled by the signals CH1EN and CH2EN; and likewise when the speech IC 730 is not in use, the programmable sound generator can use the speaker 720 for sound reproduction. It can be seen from FIG. 5 that when CH1EN=0 and CH2EN=0, the tri-state buffer circuit 620 is disabled, causing the output AudioOUT to become floating, which allows the speech IC 730 to use the speaker 720 for sound reproduction.

Figure 8:
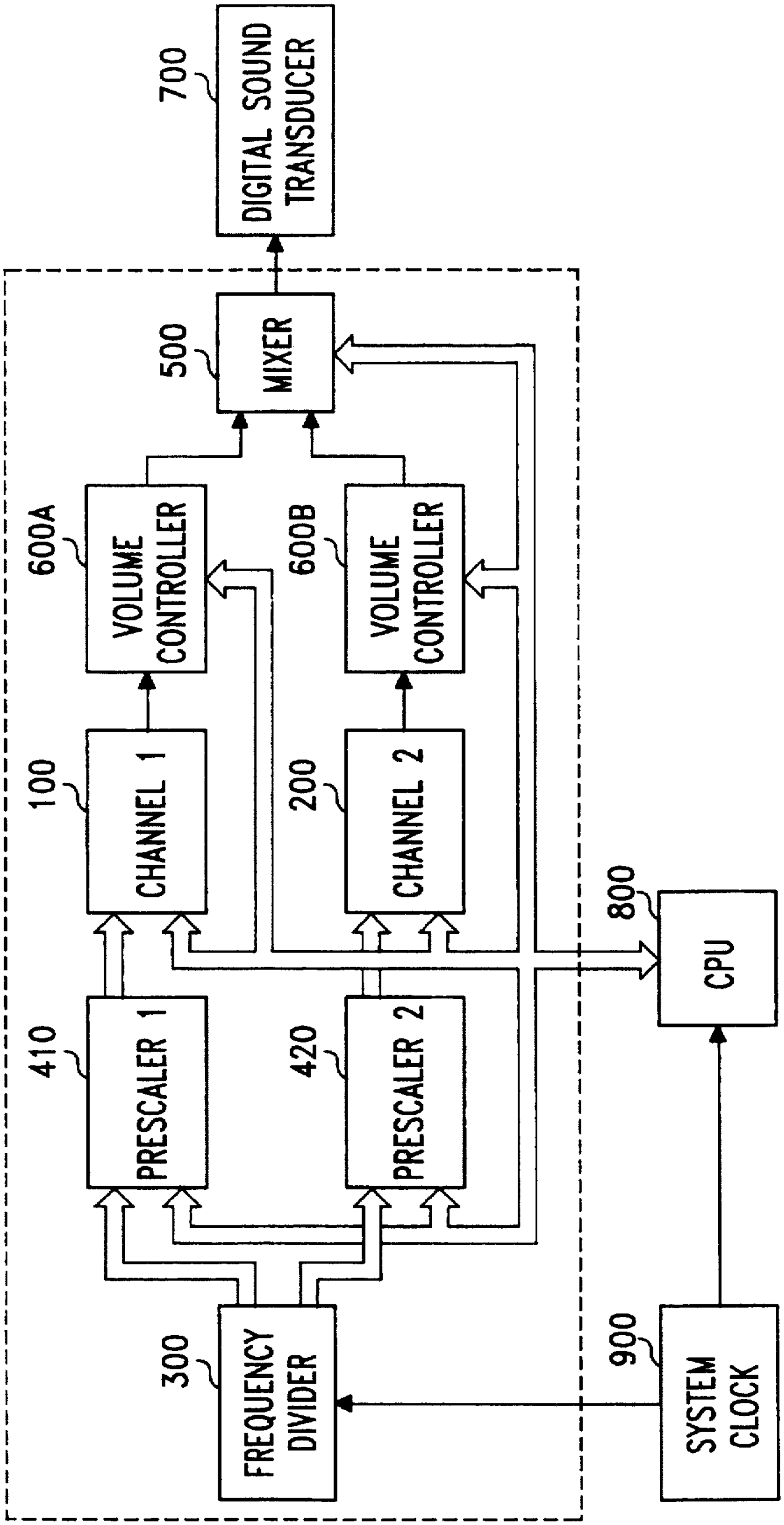
FIG. 8 shows a block diagram of a microprocessor system provided with a programmable sound generator according to the second preferred embodiment of the present invention.

The present invention has been described hitherto with exemplary preferred embodiments. However, it is to be understood that the scope of the present invention need not be limited to the disclosed preferred embodiments. For example, the number of channels is not limited to two and can be three, four, or more; each channel can have its volume control provided preceding the mixing stage; the number of volume levels can be increased to eight for fine adjustment of the volume. Broadly speaking, the second channel 200 includes an N-stage LFSR for generating a digital output serving as an N-bit tone signal and an M-stage LFSR, cooperating with said N-stage LFSR, for generating a digital output serving as an (N+M)-bit noise signal, where N=7 and M=8 in the foregoing disclosed preferred embodiment. In other variations, M can be changed to 5 for generation of 12-bit noise signal. Furthermore, as shown in FIG. 8, the volume controller 600 in the embodiment of FIG. 1 can be modified in such a way that the channels 100, 200 are each coupled with volume controllers 600A and 600B and the mixer 500 is used to mix the output of the volume controller 600A and that of the volume controller 600B. Other modifications are possible within the spirit of the present invention.

Accordingly, the present invention is intended to cover various modifications and similar arrangements within the scope defined in the following appended claims. The scope of the claims should be accorded the broadest interpretation so as to encompass all such modifications and similar arrangements.

What is claimed is:

1. A multi-channel programmable sound generator, comprising:

(a) at least a first channel for generating at least a digital output serving as a tone signal;

(b) at least a second channel for generating at least a digital output selectively switchable between a tone signal and a noise signal;

(c) clock means for generating clock signals for timing control of said first channel and said second channel;

(d) a mixer for mixing the output of said first channel and the output of said second channel in a time-multiplexing manner to produce a mixed signal; and (e) a volume controller, taking the mixed signal and a software-specified control signal as inputs, for generating a pulse train having a pulse width varied in accordance with the software-specified control signal.

2. A programmable sound generator as set forth in claim 1, further comprising:

a digital sound transducer, coupled to said volume controller, for producing an audible sound with a volume level proportional to the pulse width of the output pulse train of said volume controller.

3. A programmable sound generator as set forth in claim 1, wherein said second channel including an N-stage LFSR for generating the tone signal and an M-stage LFSR cooperating with said N-stage LFSR for generating the noise signal.

4. A programmable sound generator as set forth in claim 3, wherein said second channel comprises:

first multiplexing means, for selecting either an XOR output signal from said M-stage LFSR or the output bit from the last stage of said M-stage LFSR as output which is subsequently fed to said N-stage LFSR, said M-stage LFSR being combined with said N-stage LFSR into an (N+M) stage LFSR when the output bit from the last stage of said M-stage LFSR as output; and second multiplexing means, working in synchronism with said first multiplexer means, for selecting between an (N−1)-input NOR gate and an (N+M−1)-input NOR gate.

5. A programmable sound generator as set forth in claim 4, wherein said second channel comprises:

a T-type flip-flop for performing duty-cycle modulation on output of said (N−1)input NOR gate subsequently delayed by a D-type flip-flop into 50% duty-cycle signal serving as the digital output of said programmable sound generator.

6. A programmable sound generator as set forth in claim 4, wherein said second channel further comprises:

third multiplexer means, working in synchronism with said first multiplexer means and said second multiplexer means, for selecting the tone signal or the noise signal as output of said second channel.

7. A programmable sound generator as set forth in claim 1, wherein the software specified control signal is a set of bits with value used to vary the pulse width accordingly.

8. A programmable sound generator as set forth in claim 1, wherein said volume controller comprises a tri-state buffer circuit allowing the output of said volume controller to become floating when said first channel and said second channel are both disabled.

9. A multi-channel programmable sound generator, comprising:

(a) at least a first channel for generating at least a digital output serving as a tone signal;

(b) at least a second channel for generating at least a digital output selectively switchable between a tone signal and a noise signal;

(c) clock means for generating clock signals for timing control of said first channel and said second channel;

(d) a first volume controller, taking the digital output of said first channel and a first software-specified control signal as inputs, for generating a pulse train as output having a first pulse width varied in accordance with the software-specified control signal;

(e) a second volume controller, taking the digital output of said second channel and a second software-specified control signal as inputs, for generating a second pulse train as output having a pulse width varied in accordance with the software-specified control signal; and (f) a mixer for mixing the output of said first volume controller and the output of said second volume controller as output in a time-multiplexing manner.

10. A programmable sound generator as set forth in claim 9, further comprising:

a digital sound transducer, coupled to said volume controller, for producing an audible sound with a volume level proportional to the pulse width of the output pulse train of said volume controller.

11. A programmable sound generator as set forth in claim 9, wherein said second channel including an N-stage LFSR for generating the tone signal and an M-stage LFSR cooperating with said N-stage LFSR for generating the noise signal.

12. A programmable sound generator as set forth in claim 10, wherein said second channel comprises:

first multiplexing means, for selecting either an XOR output signal from said M-stage LFSR or the output bit from the last stage of said M-stage LFSR as output which is subsequently fed to said N-stage LFSR, said M-stage LFSR being combined with said N-stage LFSR into an (N+M) stage LFSR when the output bit from the last stage of said M-stage LFSR as output; and second multiplexing means, working in synchronism with said first multiplexer means, for selecting between an (N−1)-input NOR gate and an (N+M−1)-input NOR gate.

13. A programmable sound generator as set forth in claim 11, wherein said second channel comprises:

a T-type flip-flop for performing duty-cycle modulation on output of said (N−1)-input NOR gate subsequently delayed by a D-type flip-flop into 50% duty-cycle signal serving as the digital output of said programmable sound generator.

14. A programmable sound generator as set forth in claim 11, wherein said second channel further comprises:

third multiplexer means, working in synchronism with said first multiplexer means and said second multiplexer means, for selecting the tone signal or the noise signal as output of said second channel.

15. A programmable sound generator as set forth in claim 9, wherein the software specified control signal is a set of bits with value used to vary the pulse width accordingly.

16. A programmable sound generator as set forth in claim 9, wherein said volume controller comprises a tri-state buffer circuit allowing the output of said volume controller to become floating so as to allow said digital sound transducer to be shared by other sound processors such as a speech IC.

17. A multi-channel programmable sound generator having just digital output without analog output, comprising:

(a) at least a first channel for generating at least a digital output selectively switchable between a tone signal and a noise signal;

(b) at least a second channel for generating at least a digital output selectively switchable between a tone signal and a noise signal;

(c) clock means for generating clock signals for timing control of said first channel and said second channel;

(d) mixer means for mixing the output of said first channel and the output of said second channel in a time-multiplexing manner to produce a mixed signal; and (e) PWM volume control means, including (i) a software-specified control signal having a number of bits with a value corresponding to desired volume;

(ii) PWM pulse generating means, under control by the sound volume control signal, for generating a pulse train having a pulse width varied in accordance with the software-specified control signal; and (iii) logic means, receiving the pulse train, for applying pulse width modulation to the mixed signal from said mixer means under control by the pulse train.

18. A programmable sound generator as set forth in claim 17, further comprising:

a digital sound transducer, coupled to said volume controller, for producing an audible sound with a volume level proportional to the pulse width of the output pulse train of said volume controller.

19. A programmable sound generator as set forth in claim 17, wherein said second channel including an N-stage LFSR for generating the tone signal and an M-stage LFSR cooperating with said N-stage LFSR for generating the noise signal.

20. A programmable sound generator as set forth in claim 19, wherein said second channel comprises:

first multiplexing means, for selecting either an XOR output signal from said M-stage LFSR or the output bit from the last stage of said M-stage LFSR as output which is subsequently fed to said N-stage LFSR, said M-stage LFSR being combined with said N-stage LFSR into an (N+M) stage LFSR when the output bit from the last stage of said M-stage LFSR as output; and second multiplexing means, working in synchronism with said first multiplexer means, for selecting between an (N−1)-input NOR gate and an (N+M−1)-input NOR gate.

21. A programmable sound generator as set forth in claim 20, wherein said second channel comprises:

a T-type flip-flop for performing duty-cycle modulation on output of said (N−1)-input NOR gate subsequently delayed by a D-type flip-flop into 50% duty-cycle signal serving as the digital output of said programmable sound generator.

22. A programmable sound generator as set forth in claim 20, wherein said second channel further comprises:

third multiplexer means, working in synchronism with said first multiplexer means and said second multiplexer means, for selecting the tone signal or the noise signal as output of said second channel.

23. A programmable sound generator as set forth in claim 17, wherein the software specified control signal is a set of bits with value used to vary the pulse width accordingly.

24. A programmable sound generator as set forth in claim 17, wherein said volume controller comprises a tri-state buffer circuit allowing the output of said volume controller to become floating when said first channel and said second channel are both disabled.

25. A programmable sound generator as set forth in claim 17, wherein said mixer comprises:

a clock signal;

first logic means, taking the first input serial digital signal and said clock signal as inputs, said first logic means enabling the first input serial digital signal as output thereof when said clock signal is logic 1 and disable the first input serial digital signal as output thereof when said clock signal is logic 0; and second first logic means, taking the second input serial digital signal and the clock signal as inputs, said second logic means enabling the second input serial digital signal as output thereof when said clock signal is logic 0 and disable the second input serial digital signal as output thereof when said clock signal is logic 1.

26. A programmable sound generator for generating a digital output selectively switchable between a tone signal and a noise signal, comprising:

(a) an N-stage LFSR for generating a digital output serving as an N-bit tone signal;

(b) an M-stage LFSR, cooperating with said N-stage LFSR, for generating a digital output serving as an (N+M)-bit noise signal;

(c) first multiplexing means, for selecting either an XOR output signal from said M-stage LFSR or the output bit from the last stage of said M-stage LFSR as output which is subsequently fed to said N-stage LFSR, said M-stage LFSR being combined with said N-stage LFSR into an (N+M) stage LFSR when the output bit from the last stage of said M-stage LFSR as output;

(d) second multiplexing means, working in synchronism with said first multiplexer means, for selecting between an (N−1)-input NOR gate and an (N+M−1)-input NOR gate.

(e) a T-type flip-flop for performing duty-cycle modulation on output of said (N−1)-input NOR gate subsequently delayed by a D-type flip-flop into 50% duty-cycle signal serving as the digital output of said programmable sound generator; and (f) third multiplexer means, working in synchronism with said first multiplexer means and said second multiplexer means, for selecting the tone signal or the noise signal as output of said second channel.

27. A method of generating multi-channel digital sounds, comprising the following steps of:

(1) generating a first digital sound signal serving as a first tone signal;

(2) generating a second digital sound signal selectively switchable between a second tone signal and a second noise signal;

(3) generating clock signals for timing control of the generation of the first digital sound signal and the second digital sound signal;

(4) mixing the first digital sound signal and the second digital sound signal in a time-multiplexing manner to produce a mixed signal;

(5) controlling the volume of the mixed signal by generating a pulse train having a pulse width varied in accordance with a software-specified control signal; and (6) directing the pulse train to a digital sound transducer so as to produce audible sound.

* * * * *

UNITED STATES PATENT AND TRADEMARK OFFICE

CERTIFICATE OF CORRECTION

PATENT NO. : 5,802,187

DATED : September 1, 1998

INVENTOR(S) : J. Hsu

It is certified that error appears in the above-identified patent and that said Letters Patent is hereby corrected as shown below:

| COLUMN | LINE | |
|---|---|---|
| 7 (Claim 3, | 64 line 2) | "including" should read --includes-- |
| 8 (Claim 4, | 9 line 9) | "LFSR as" should read --LFSR is-- |
| 8 (Claim 5, | 17 line 4) | "(N-1)input" should read --(N-1)-input-- |
| 8 (Claim 7, | 28 line 3) | before "value" please insert --a-- |
| 8 (Claim 11, | 64 line 2) | "including" should read --includes-- |
| 9 (Claim 12, | 9 line 9) | "LFSR as" should read --LFSR is-- |
| 9 (Claim 13, | 17 line 4) | before "output" please insert --an-- |
| 9 (Claim 15, | 30 line 3) | before "value" please insert --a-- |
| 9 (Claim 17, | 52 line 16) | before "desired" please insert --a-- |

UNITED STATES PATENT AND TRADEMARK OFFICE

CERTIFICATE OF CORRECTION

PATENT NO. : 5,802,187

DATED : September 1, 1998

INVENTOR(S) : J. Hsu

It is certified that error appears in the above-identified patent and that said Letters Patent is hereby corrected as shown below:

| COLUMN | LINE | |
|---|---|---|
| 9 (Claim 19, | 67 line 2) | "including" should read --includes-- |
| 10 (Claim 20, | 12 line 9) | "LFSR as" should read --LFSR is-- |
| 10 (Claim 21, | 20 line 4) | before "output" please insert --the-- |
| 10 (Claim 23, | 33 line 3) | before "value" please insert --a-- |
| 11 (Claim 26, | 2 line 15) | "LFSR as" should read --LFSR is-- |
| 11 (Claim 26, | 6 line 19) | "." should read --;-- |

UNITED STATES PATENT AND TRADEMARK OFFICE

CERTIFICATE OF CORRECTION

PATENT NO. : 5,802,187

DATED : September 1, 1998

INVENTOR(S) : J. Hsu

It is certified that error appears in the above-identified patent and that said Letters Patent is hereby corrected as shown below:

| COLUMN | LINE | |
|---|---|---|
| 12 (Claim 27, | 15 line 19) | before "audible" please insert --an-- |

Signed and Sealed this

Ninth Day of March, 1999

Attest:

Q. TODD DICKINSON

Attesting Officer

*Acting Commissioner of Patents and Trademarks*